2,956,043
INHIBITION OF MOLD CORROSION FOR QUATERNIZED POLYMERS

Henry E. Railsback, Phillips, Tex., and William B. Reynolds, Bartlesville, Okla., assignors to Phillips Petroleum Company, a corporation of Delaware No Drawing. Filed Oct. 22, 1956, Ser. No. 617,275

18 Claims. (Cl. 260—45.7)

This invention relates to a method of preventing corrosion of molds when curing a composition comprising quaternizable heterocyclic nitrogen-base polymer and quaternizing agent. In another aspect this invention relates to a compounded stock comprising quaternizable heterocyclic nitrogen-base polymer and quaternizing agent which can be cured with substantially no resulting corrosion of the curing molds. In still other aspects this invention relates to a product comprising a quaternized heterocyclic nitrogen-base polymer which can be made by molding and curing without corroding the curing molds, and to a method of making such a product.

Quaternized polymers of heterocyclic nitrogen bases of the pyridine and quinoline series which have been cured are valuable materials for many applications. These compounds are quite resistant to the action of oils and various types of solvents. Good oil resistance enables these materials to be especially useful as gasket stock. Serious corrosion of the curing molds has been observed, however, when these quaternized stocks are molded and cured. While the exact cause of this corrosion has not been determined, it has been observed that the corrosion problem is particularly serious when the quaternizing agent is an organic halide. This problem has existed for several years and its magnitude is such that commercial use of these valuable quaternized polymers is at stake. Corrosion or mold pitting of any degree cannot be tolerated by fabricators of finished rubber articles. Serious consideration has been given to such costly solutions as gold or silver plating the molds or constructing them of titanium metal. Such solutions have obvious drawbacks since the industry would be extremely reluctant to abandon its chromium plated and steel molds currently in use.

We have discovered that quite unexpectedly the above-described corrosion problem can be virtually eliminated by incorporating into the polymer stock prior to curing a metal N-substituted dithiocarbamate. For some quaternized stocks the amount of corrosion is greatly reduced while for others it has been completely eliminated. By balancing the amounts of quaternizing agent and corrosion inhibitor the problem of mold corrosion can be successfully solved. While metal N-substituted dithiocarbamates have found utility as vulcanization accelerators in nonquaternized elastomers, their value as a corrosion inhibitor in quaternized heterocyclic nitrogen-base polymers was totally unexpected. In fact, the trend of art has been to avoid the use of these highly active vulcanization accelerators in quaternized products. Particularly valuable for complete protection are the nickel, copper, lead and iron derivatives of the lower alkyl N-substituted dithiocarbamates.

It is an object of this invention to provide a method of curing compositions comprising quaternizable heterocyclic nitrogen-base polymers and quaternizing agents with substantially no mold corrosion. It is another object of this invention to provide a method of making such a quaternized product without costly damage from corrosion to the curing molds. Still another object is to provide a compounded stock containing (1) a polymer prepared from a monomer system comprising a polymerizable heterocyclic nitrogen-base monomer and (2) a quaternizing agent, which can be molded and cured without damaging the molds. Another object is to provide a product from materials comprising a heterocyclic nitrogen-base monomer which product can be formed by quaternizing and curing in steel molds without corrosion thereof. Other objects, advantages and features will be apparent to those skilled in the art from the following description, examples and appended claims.

Quaternized heterocyclic nitrogen-base polymers are known in the art and their formation per se is not a part of this invention. These polymers which have proved especially valuable are those prepared from polymerizable heterocyclic nitrogen-base compounds of the pyridine and quinoline series either as homopolymers or with other materials copolymerizable therewith such as conjugated dienes and monomers having an active vinylidene group. These polymers and their quaternization are fully described in the copending application of Pritchard, filed June 4, 1956, Serial No. 588,957.

The polymers to which this invention applies can be prepared by any suitable method, such as by emulsion polymerization. For example, copolymers of heterocyclic nitrogen-base monomers and conjugated dienes can be formed over a wide range of molecular weights ranging from fluid and very viscous liquids to hard solid rubbery materials.

One convenient method of preparing these polymers is by polymerization of the monomers in an aqueous emulsion in the presence of soap, potassium persulfate and an aliphatic mercaptan. At the conclusion of the reaction a short-stopping agent and an antioxidant are added. Coagulation can be effected by various well-known techniques and the polymer dried. Heating in vacuum at a temperature of about 60° C. for about 48 hours is generally sufficient to dry the polymer. Other well-known polymerization recipes can also be used for preparing the polymers employed in the practice of this invention. The heterocyclic nitrogen-base monomers which are used to prepare the polymers for our invention have the formula

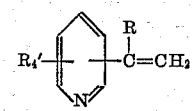

or

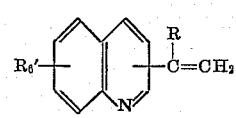

or

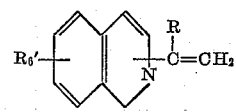

where R is a hydrogen or a methyl radical and each R' is an alkyl radical or a hydrogen, the combined R' groups having not over 12 carbon atoms. It is to be understood that mixtures of various copolymerizable heterocyclic nitrogen bases and materials copolymerizable therewith, preferably conjugated dienes, can be employed in the formation of these polymers together with, if desired, up to about 50 percent by weight, preferably between 5 and 30 percent by weight of the total monomeric material, of other copolymerizable materials, such as acrylonitrile, styrene, and the like.

Representative heterocyclic nitrogen base compounds useful in the practice of this invention include: 2-vinylpyridine; 2-methyl-5-vinylpyridine; 5-methyl-2-vinylpyridine; 3-ethyl-5-vinylpyridine; 5-ethyl-2-vinylpyridine; 4-methyl-3-vinylpyridine; 2,3,4-trimethyl-5-vinylpyridine; 2-isopropenylpyridine; 5-propyl-2-isopropenylpyridine; 2-octyl-5-vinylpyridine; 5-dodecyl-2-vinylpyridine; 2-vinylquinoline; 8-ethyl-2-vinylquinoline; 4-hexyl-5-vinylquinoline; 1-vinylisoquinoline; 5-methyl-1-isopropenylisoquinoline; and the like.

Materials copolymerizable with the above-mentioned heterocylic nitrogen-base compounds include conjugated dienes and other copolymerizable materials such as styrene; alpha-methyl-styrene; halogen-, alkyl-, and alkoxy-substituted styrenes; acrylonitrile; methacrylonitrile; methyl acrylate; methyl methacrylate; ethyl acrylate; ethyl methacrylate; methyl vinyl ketone; methyl isopropenyl ketone; methyl vinyl ether; and the like.

The conjugated dienes employed in the production of the copolymers employed in the practice of this invention are preferably those conjugated dienes which contain four to six, inclusive, carbon atoms per molecule and include 1,3-butadiene, isoprene, piperylene, methylpentadiene, 2,3-dimethyl-1,3-butadiene, chloroprene and others. However, conjugated diolefins having more than 6, such as 8, carbon atoms per molecule can also be used. Furthermore, various alkoxy, such as methoxy and ethoxy, and cyano derivatives of these conjugated diolefins can also be used in preparing the polymers for our invention.

For the production of the copolymers employed in the practice of our invention the amount of copolymerizable material employed, such as a conjugated diene, is generally in the range of from 25 to 98 parts per 100 parts by weight of the total monomeric material, preferably 50 to 98 parts per 100 parts by weight, and the amount of copolymerizable heterocyclic nitrogen base employed is in the range from 75 to 2 parts per 100 parts by weight of the total monomeric material, preferably 50 to 2 parts per 100 parts by weight, the proportions of the monomeric material employed depending upon the type of copolymer desired.

Quaternizing agents or mixtures thereof which yield solid polymers in accordance with this invention are numerous and include various halogen substituted hydrocarbons such as substituted cycloalkanes and substituted alkanes. These compounds contain at least one hydrogen atom attached to a carbon atom. The substituted alkanes in turn include alkyl halides, alkylene halides, and aromatic substituted halogenated alkanes. Representative cycloalkanes include 1,2-dibromocyclohexane, 1-methyl-2,3-dichlorocyclopentane, and the like. Representative alkyl halides include methyl iodide, methyl bromide, ethyl iodide, propyl iodide, hexyl iodide, nonyl iodide, cetyl bromide, and the like. Representative alkylene halides include 1,2-dichloroethane, 1,2-dibromoethane, 1,2-dichloropropane, 1,2-dibromooctane and the like. Representative aromatic substituted halogenated alkanes include benzyl chloride, benzal chloride, benzotrichloride, and halogenated xylenes, particularly the chlorinated xylenes such as 1,3-, and 1,4-bis(trichloromethyl)benezene; 1,2-, 1,3- and 1,4-bis(dichloromethyl)-benzene; 1,2-, 1,3-, and 1,4-bis(monochloromethyl)benzene; 1-trichloromethyl-2-dichloromethylbenzene; 1-trichloromethyl-4-monochloromethylbenzene; 1-dichloromethyl-3-monochloromethylbenzene; and the like.

Other halogen substituted alkanes include bromoform, chloroform, iodoform and the like which contain at least one hydrogen atom attached to a carbon atom. The substituted halogenated hydrocarbons also include 2,3-dibromopropene-1 and various polyhalogenated alkanes such as 1,2,3,4-tetrabromobutane and polyhalogenated cycloalkanes such as hexachlorocyclopentadiene. Other halogenated organic compounds useful as quaternizing agents include acetyl chloride, chloroacetyl chloride, ethylene chlorohydrin, picryl chloride, benzoyl chloride, benzene sulfonyl chloride, and the like. Another useful group of quaternizing agents includes methyl sulfate, ethyl sulfate, methylbenzene sulfate, and the like. The foregoing enumeration is not intended to include all the possible suitable quaternizing agents, but is only representative since many others can be used.

The quaternizing agents for which we have found our invention especially valuable in the inhibition of serious mold corrosion are the organic halides, particularly such agents as benzotrichloride, benzyl chloride, benzal chloride and hexachloro-p-xylene. Specific polymers for which we have found our invention particularly useful are polymers which are prepared by polymerizing a monomer system comprising, as the heterocyclic nitrogen-base monomer, 2-vinylpyridine or 2-methyl-5-vinylpyridine. These can be used as the homopolymer but generally are copolymerized with a conjugated diene such as butadiene or formed as the terpolymer with acrylonitrile.

When quaternizing the above-described heterocyclic nitrogen-base polymers, an amount of quaternizing agent is generally employed which is sufficient to convert a portion of the pyridine or quinoline units of the polymer to the corresponding pyridinium or quinolinium units. If desired, more or less than a stoichiometric amount of quaternizing agent can be employed depending upon the desired physical properties of the product. Generally, the amount of quaternizing agent is about 0.2 to 1.1 mols per mol of reactive nitrogen in the polymer. Cellular products can be produced by employing an excess of quaternizing agent, for example, up to 5 mols per mol of reactive nitrogen. The curing temperature at which the quaternizing agent is reacted in the mold is usually in the range between 0 to 250° C. although higher or lower temperatures can be used. The time required to substantially completely effect a reaction is dependent upon the temperature employed and usually varies from a few minutes, about 5 to 10 minutes, to about 10 hours or more.

The metal derivatives of the N-substituted dithiocarbamates which are used in this invention as corrosion inihibitors are represented by the formula

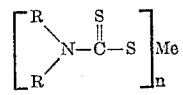

where each R is selected from the group consisting of hydrogen, alkyl, cycloalkyl, aryl, and combinations of these radicals such as alkaryl, aralkyl, and alkylcycloalkyl and radicals which, together with the nitrogen, form a heterocyclic ring. The total number of carbon atoms in the combined R groups can vary from 1 to 20. Me is a metal and $n$ is the valence of the metal. Preferred for maximum effectiveness in corrosion inhibition are the metal derivatives of the N-substituted dithiocarbamates having substituents which are lower alkyls. By "lower alkyls" we mean, in this specification, having from 1 to 6 carbon atoms and being straight chain or branched chain.

The compounds which are most useful as a corrosion inhibitor and which are preferred for complete effectiveness are the lower alkyldithiocarbamate derivatives of nickel, copper, iron, and lead; particularly the methyl, ethyl, propyl and butyl substituted derivatives. Compounds which produce substantial improvement include derivatives of cobalt, zinc and selenium. Other dithiocarbamates which have some effect include derivatives of cadmium, tin, manganese, and bismuth. Typical compounds of this type are nickel diethyldithiocarbamate, nickel dibutyldithiocarbamate, cobalt dipropyldithiocarbamate, cobalt dibutyldithiocarbamate, zinc dibutyldithiocarbamate, zinc dimethyldithiocarbamate, tin dimethyldithiocarbamate, manganese diethyldithiocarbamate, selenium diethyldithiocarbamate, bismuth dimethyldithiocarbamate, cuprous dimethyldithiocarbamate, nickel di-n-butyldithiocarbamate, cuprous di-isohexyldithiocarbamate, nickel di-tert-hexyldithiocarbamate, zinc di-n-propyldithiocarbamate, lead di-n-butyldithiocarbamate, ferric di-isobutyldithiocarbamate, nickel di-tert-butyldithiocarbamate, nickel di-isobutyldithiocarbamate, ferric di-n-amyldithiocarbamate, zinc di-sec-amyldithiocarbamate, cupric dibutyl dithiocarbamate, ferric dibutyldithiocarbamate, cadmium dibutyldithiocarbamate, cadmium diethyldithiocarbamate, lead dibutyldithiocarbamate, and the like.

The quantity of metal N-substituted dithiocarbamate required to prevent mold corrosion when quaternized polymers of the type hereinbefore described are cured depends upon both the quaternizing agent and the particular dithiocarbamate employed. Generally, however, the amount of dithiocarbamate will be in the range between 0.02 and 2 mols of the dithiocarbamate per mol of quaternizing agent. When using materials of the preferred classes above described, the amount of dithiocarbamate will generally be in the range between 0.05 and 1 mol per mol of quaternizing agent. Optimum amounts of corrosion inhibitor can readily be determined, however, for any given quaternizing agent.

Any of several suitable methods can be employed to incorporate the dithiocarbamate into the polymeric material, such as by mill mixing or masticating or by mixing in an internal mixer such as a Banbury mixer. These mixing methods are those generally employed in the art for compounding stocks of this general nature prior to curing. Also, addition to the latex prior to coagulation is an alternative method.

To further describe our invention specific embodiments are set forth in the following examples which are meant to be exemplary only and should not be interpreted as limiting our invention unduly.

EXAMPLE I

An 85/15 butadiene/2-methyl-5-vinylpyridine copolymer, prepared by emulsion polymerization at 41° F., was compounded in gasket stock recipes in which the rubber was quaternized with hexachloro-p-xylene.[1] A rubber of this type can be obtained by copolymerizing butadiene with 2-methyl-5-vinylpyridine in accordance with the following recipe:

| | Parts by weight |
|---|---|
| Water | 200 |
| Butadiene | 85 |
| 2-methyl-5-vinylpyridine | 15 |
| Potassium fatty acid soap | 6 |
| KOH | 0.1 |
| KCl | 0.3 |
| Tamol N [1] | 0.3 |
| $FeSO_4 \cdot 7H_2O$ | 0.02 |
| Sequestrene AA [2] | 0.04 |
| Sodium formaldehyde sulfoxylate | 0.1 |
| p-Menthane hydroperoxide | 0.1 |
| Tert-dodecyl mercaptan, original charge | 0.24 |
| Tert-dodecyl mercaptan, increment at 60 percent conversion | 0.24 |

[1] Sodium salt of a naphthalene sulfonic acid condensed with formaldehyde.
[2] Ethylenediamine tetraacetic acid.

[1] 1,4-bis(trichloromethyl)benzene.

The gasket stock recipes were as follows:

| | Parts by Weight | |
|---|---|---|
| | A | B |
| Butadiene/2-methyl-5-vinylpyridine rubber | 100 | 100 |
| Carbon black [1] | 150 | 150 |
| BLE [2] | 3 | 3 |
| Plasticizer SC [3] | 20 | 20 |
| Zinc oxide | 3 | 5 |
| Stearic Acid | 1 | 1 |
| Sulfur | 0.25 | 0.25 |
| Altax [4] | 3 | 3 |
| Tuads [5] | 2 | 2 |
| Hexachloro-p-xylene | 10 | 10 |
| Nickel dibutyldithiocarbamate [6] | 0, 1, 3, 5 | 1, 3, 5 |

[1] Thermax. A soft, semi-reinforcing carbon black.
[2] High temperature reaction product of diphenylamine and acetone.
[3] Glycol ester of vegetable oil fatty acid.
[4] Benzothiazyl disulfide.
[5] Tetramethyl thiuram disulfide.
[6] Mols nickel dibutyldithiocarbamate per mol hexachloro-p-xylene are 0.119, 0.356, and 0.593, respectively. These amounts correspond to 1, 3, and 5 parts by weight of dithiocarbamate per 10 parts by weight of hexachloro-p-xylene.

The stocks were milled and then cured for 45 minutes at 307° F. against No. 321 stainless steel shim stock. The shims were examined for pitting and physical properties of the various test specimens were determined. Results were as follows:

Table I

| | Recipe A | | | | Recipe B | | |
|---|---|---|---|---|---|---|---|
| Zinc oxide, parts | 3 | 3 | 3 | 3 | 5 | 5 | 5 |
| Nickel dibutyldithiocarbamate, parts | 0 | 1 | 3 | 5 | 1 | 3 | 5 |
| Stainless steel pitting [1] | 10 | 3 | 0 | 0 | 0-1 | 0 | 0 |
| Compression set, percent | 8.4 | 5.1 | 5.5 | 5.5 | 4.4 | 4.4 | 5.4 |
| Shore hardness | 80 | 81.5 | 80 | 78 | 83 | 82.5 | 80.5 |
| Tensile, pounds per square inch, 80° F | 1,590 | 2,190 | 1,210 | 2,225 | 2,340 | 2,320 | 1,830 |
| Elongation, percent, 80° F | 140 | 170 | 200 | 220 | 185 | 200 | 110 |
| 200° F. hot tensile, pounds per square inch | 580 | 750 | 925 | 875 | 930 | 940 | 850 |

[1] 0=no pits; 10=many pits.

Single sheets of stainless steel were used to cure ten consecutive slabs of the second and third stocks from Recipe A and the first and second stocks from Recipe B and the same ratings as given in the preceding table were obtained.

As shown by the above data, nickel dibutyldithiocarbamate completely eliminates mold corrosion when hexachloro-p-xylene is used as the quaternizing agent. Substantial improvement was noted even with small concentrations of the dibutyldithiocarbamate and corrosion was completely eliminated with the higher dosages.

EXAMPLE II

The rubber described in Example I was compounded in the following gasket stock recipes:

| | Parts by Weight | |
|---|---|---|
| | A | B |
| Butadiene/2-methyl-5-vinylpyridine rubber | 100 | 100 |
| Carbon black [1] | 150 | 150 |
| BLE [1] | 3 | 3 |
| Plasticizer SC [1] | 20 | 20 |
| Zinc oxide | 5 | 5 |
| Stearic acid | 1 | 1 |
| Sulfur | 0.25 | 0.25 |
| Altax [1] | 3 | 3 |
| Tuads [1] | 2 | 2 |
| Benzotrichloride | 20 | 20 |
| Nickel dibutyldithiocarbamate [2] | | 10 |

[1] As in Example I.
[2] The quantity corresponds to 0.371 mols of dithiocarbamate per mol of benzotrichloride.

The stocks were milled and cured 45 minutes at 307° F. against stainless steel shim stock. The shims were examined for pitting and physical properties of the test specimens were determined. Results were as follows:

*Table II*

|  | Recipe A | Recipe B |
|---|---|---|
| Nickel dibutyldithiocarbamate | 0 | 10 |
| Stainless steel pitting [1] | 10 | 2 |
| Compression set, percent |  | 10.6 |
| Shore hardness |  | 65.5 |
| Tensile, pounds per square inch, 80° F | 1,610 | 1,630 |
| Elongation, percent, 80° F | 310 | 470 |

[1] 0=no pits; 10=many pits.

The data of Example II shows that substantial corrosion inhibition can be realized by the practice of our invention when quaternizing with benzotrichloride. It should be also noted that very little effect upon the final physical properties was obtained.

EXAMPLE III

In order to determine the effectiveness of various amounts of nickel dibutyldithiocarbamate for mold corrosion inhibition in quaternized heterocyclic nitrogen-base rubbers, the rubber described in Example I was compounded as follows:

| | Parts by weight |
|---|---|
| Butadiene/2-methyl-5-vinylpyridine rubber | 100 |
| Carbon black (1) | 150 |
| Zinc oxide | 5 |
| Stearic acid | 1 |
| Plasticizer SC (1) | 20 |
| BLE (1) | 3 |
| Sulfur | 0.25 |
| Altax (1) | 3 |
| Benzotrichloride | variable |
| Hexachloro-p-xylene | variable |
| Nickel dibutyldithiocarbamate | variable |

[1] As in Example I.

The stocks were milled and cured 45 minutes at 307° F. against stainless steel shim stock. The steel was examined for pitting. The following physical properties and pitting ratings were obtained:

*Table III*

| Benzotrichloride phr.[1] | Hexachloro-p-xylene phr.[1] | NBC,[2] phr.[1] | 80° F. | | | Pitting Rating [3] |
|---|---|---|---|---|---|---|
| | | | 300% Modulus, p.s.i. | Tensile, p.s.i. | Elongation, Percent | |
| 10 | --------- | 0 | 1,350 | 1,580 | 400 | 10 |
| 10 | --------- | 2 | 1,140 | 1,500 | 470 | 8 |
| 10 | --------- | 4 | 1,130 | 1,460 | 500 | 1 |
| 10 | --------- | 6 | 1,180 | 1,570 | 470 | 2 |
| 15 | --------- | 0 | 1,150 | 1,540 | 430 | 10 |
| 15 | --------- | 4 | 1,060 | 1,590 | 450 | 5 |
| 15 | --------- | 6 | 1,000 | 1,500 | 440 | 3 |
| 15 | --------- | 8 | 1,010 | 1,550 | 480 | 0 |
| 20 | --------- | 0 | 1,350 | 1,620 | 410 | 10 |
| 20 | --------- | 6 | 1,370 | 1,700 | 410 | 2 |
| 20 | --------- | 8 | 1,100 | 1,620 | 430 | 1 |
| 20 | --------- | 10 | 1,300 | 1,810 | 430 | 0 |
| --------- | 5 | 0 | --------- | 1,960 | 250 | 5 |
| --------- | 5 | 0.5 | --------- | 2,230 | 260 | 0 |
| --------- | 5 | 1 | --------- | 2,080 | 280 | 0 |
| --------- | 5 | 2 | 2,060 | 2,080 | 360 | 0 |
| --------- | 10 | 0 | --------- | 1,830 | 150 | 10 |
| --------- | 10 | 1 | --------- | 2,400 | 180 | 0-1 |
| --------- | 10 | 2 | --------- | 2,280 | 200 | 0 |
| --------- | 10 | 3 | --------- | 2,270 | 210 | 0 |
| --------- | 15 | 0 | --------- | 1,800 | 140 | 10 |
| --------- | 15 | 3 | --------- | 2,180 | 150 | 1 |
| --------- | 15 | 5 | --------- | 2,400 | 160 | 0 |
| --------- | 15 | 8 | --------- | 2,430 | 170 | 0 |

[1] Parts by weight per 100 parts rubber.
[2] Nickel dibutyldithiocarbamate.
[3] 0=no pits; 10=many pits.

As shown by the above data, nickel dibutyldithiocarbamate is a highly effective corrosion inhibitor, even in small amounts, for the hexachloro-p-xylene quaternized stocks. For the benzotrichloride quaternized rubber, corrosion can be completely eliminated without adversely affecting physical properties.

EXAMPLE IV

The rubber described in Example I was compounded as shown in Example III employing hexachloro-p-xylene as a quaternizing agent and 5 parts by weight of various metal alkyldithiocarbamates. Slabs of each stock were cured against stainless steel shims for 45 minutes at 307° F. and a corrosion inhibition evaluation is shown below.

| | |
|---|---|
| No inhibitor added | high degree of corrosion. |
| Cupric dimethyldithiocarbamate | no corrosion. |
| Cupric dibutyldithiocarbamate | no corrosion. |
| Nickel dibutyldithiocarbamate | no corrosion. |
| Lead dibutyldithiocarbamate | no corrosion. |
| Lead dimethyldithiocarbamate | very little corrosion. |
| Ferric dimethyldithiocarbamate | very little corrosion. |
| Ferric dibutyldithiocarbamate | very little corrosion. |
| Zinc dimethyldithiocarbamate | very little corrosion. |

Other derivatives used showing improvement but not elimination of corrosion were zinc dibutyldithiocarbamate, cobalt dimethyldithiocarbamate, bismuth dimethyldithiocarbamate, manganese dimethyldithiocarbamate, stannous dimethyldithiocarbamate, selenium diethyldithiocarbamate, and cobalt dibutyldithiocarbamate.

EXAMPLE V

Rubber used in the previous examples was compounded as described in Example III using hexachloro-p-xylene as quaternizing agent. Various metal alkyldithiocarbamate derivatives used in Example IV were used in smaller quantities (3 parts by weight per 100 parts of rubber). In these runs 2 parts of methyl Tuads (tetramethyl thiuram disulfide) was added to improve scorch time. Specimens were cured against 321 stainless steel as in previous examples and again the control, without additive, showed severe pitting of the steel plate. Nickel dibutyldithiocarbamate, cupric dimethyldithiocarbamate, and cupric dibutyldithiocarbamate were effective in completely preventing corrosion at this lower dosage.

We claim:

1. A quaternizable heterocyclic nitrogen-base polymer composition comprising a polymer of a monomer having the formula system comprising a heterocyclic nitrogen-base monomer selected from the group consisting of

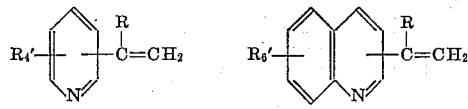

and

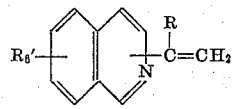

where R is selected from the group consisting of hydrogen and methyl, each R' is selected from the group consisting of hydrogen and alkyl, and the combined R' groups have not over 12 carbon atoms, a quaternizing agent which quaternizes heterocyclic nitrogen-base polymers with a mold corroding effect, and a metal N-substituted dithiocarbamate as an inhibitor of such mold corrosion, said metal being selected from the group consisting of nickel, copper, iron, lead, cobalt, zinc, selenium, cadmium, tin, manganese, and bismuth.

2. A compounded stock having a quaternizable heterocyclic nitrogen-base which comprises a polymer of a monomer system comprising a heterocyclic nitrogen-base monomer having the formula selected from the group consisting of

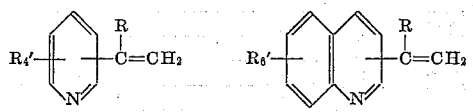

and

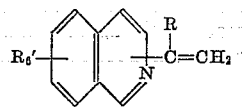

where R is selected from the group consisting of hydrogen and methyl, each R' is selected from the group consisting of hydrogen and alkyl, and the combined R' groups have not over 12 carbon atoms, a quaternizing agent which quaternizes heterocyclic nitrogen-base polymers with a mold corroding effect, and as a corrosion inhibitor a metal N-substituted dithiocarbamate having the formula

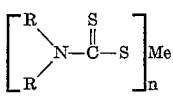

where each R selected from the group consisting of hydrogen and alkyl radicals, the combined R groups having a total number of carbon atoms in the range of 1 to 20, Me is a metal selected from the group consisting of nickel, copper, iron, lead, cobalt, zinc, selenium, cadmium, tin, manganese, and bismuth, and $n$ is the valence of the metal.

3. A polymeric composition from heterocyclic nitrogen bases compounded for quaternizing with substantially no mold corrosion which comprises a polymer of a monomer system comprising heterocyclic nitrogen-base having the formula

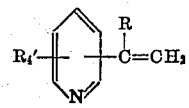

where R is selected from the group consisting of hydrogen and methyl and each R' is selected from the group consisting of hydrogen and alkyl, the combined R' groups having not over 12 carbon atoms, a halogen-substituted hydrocarbon quaternizing agent which quaternizes heterocyclic nitrogen-base polymers with a mold corroding effect, and as a corrosion inhibitor a metal N-substituted lower alkyl dithiocarbamate said metal being selected from the group consisting of nickel, copper, iron, lead, cobalt, zinc, selenium, cadmium, tin, manganese and bismuth.

4. A compounded stock of quaternizable heterocyclic nitrogen-base polymer which can be cured with substantially no mold corroding effect comprising a polymer of a monomer system which comprises a vinyl-substituted pyridine compound and a copolymerizable conjugated diene, a halogen-substituted hydrocarbon quaternizing agent which quaternizes with a mold corroding effect, selected from the group consisting of hexachloro-p-xylene, benzotrichloride, benzyl chloride and benzal chloride, and a corrosion inhibiting amount of a metal alkyldithiocarbamate where each alkyl substituent is a lower alkyl and the metal is selected from the group consisting of nickel, copper, iron and lead.

5. A compounded stock of heterocyclic nitrogen-base polymer which is quaternizable with substantially no mold corroding effect comprising a copolymer of butadiene and 2-methyl-5-vinylpyridine, a quaternizing amount of hexachloro-p-xylene, and a corrosion inhibiting amount of nickel dibutyldithiocarbamate.

6. A method of inhibiting mold corrosion while curing a quaternizable heterocyclic nitrogen-base polymer stock containing a polymer of a monomer system comprising heterocyclic nitrogen-base monomer selected from the group consisting of pyridine compounds and quinoline compounds, said compounds having the formula selected from the group consisting of

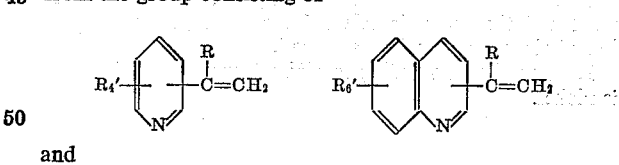

and

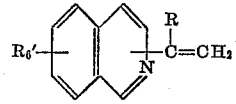

where R is selected from the group consisting of hydrogen and methyl, each R' is selected from the group consisting of hydrogen and alkyl, and the combined R' groups have not over 12 carbon atoms, a quaternizing agent which quaternizes heterocyclic nitrogen-base polymers with a mold corroding effect which comprises incorporating into said stock prior to curing a metal N-substituted dithiocarbamate, said metal being selected from the group consisting of nickel, copper, iron, lead, cobalt, zinc, selenium, cadmium, tin, manganese and bismuth.

7. A method of forming a quaternized heterocyclic nitrogen-base polymeric material in such a manner that substantially no corrosion of the mold occurs during the curing step which comprises blending a quaternizing agent which quaternizes heterocyclic nitrogen-base polymers with a mold corroding effect with a polymer of a monomer having the formula system comprising heterocyclic nitrogen-base monomer selected from the group consisting of

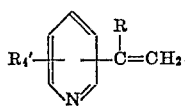 

and

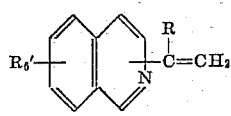

where R is selected from the group consisting of hydrogen and methyl, each R' is selected from the group consisting of hydrogen and alkyl, and the combined R' groups have not over 12 carbon atoms, mixing therewith a metal N-substituted dithiocarbamate having the formula

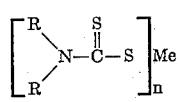

where each R is selected from the group consisting of hydrogen and alkyl radicals, the total carbon atoms of both R groups being in the range of from 1 to 20, Me is a metal selected from the group consisting of nickel, copper, iron, lead, cobalt, zinc, selenium, cadmium, tin, manganese and bismuth, and $n$ is the valence of the metal, thereby forming a quaternizable stock, placing said stock in a mold, and curing said stock under conditions to quaternize said polymer.

8. A method of forming a quaternized heterocyclic nitrogen-base polymeric product so that while curing said product corrosion of the curing molds is substantially eliminated which comprises blending with a polymer of a monomer system comprising a vinyl-substituted heterocyclic nitrogen-base monomer selected from the group consisting of pyridine compounds and quinoline compounds, a quaternizing amount of halogen-substituted hydrocarbon quaternizing agent which quaternizes heterocyclic nitrogen-base polymers with a mold corroding effect and a corrosion inhibiting amount of a metal alkyldithiocarbamate when each alkyl substituent is lower alkyl and the metal is selected from the group consisting of nickel, copper, iron and lead.

9. A method according to claim 8 wherein said metal is nickel.

10. A method according to claim 8 wherein said metal is copper.

11. A method according to claim 8 wherein said metal is iron.

12. A method according to claim 8 wherein said metal is lead.

13. A method of forming a quaternized heterocyclic nitrogen-base polymer which comprises blending with a copolymer of butadiene and 2-methyl-5-vinylpyridine a quaternizing amount of hexachloro-p-xylene and a corrosion inhibiting amount of nickel dibutyldithiocarbamate, thereby forming a corrosion inhibited quaternizable stock, curing said stock in a mold and removing quaternized product.

14. A method of forming a quaternized heterocyclic nitrogen-base polymer which comprises blending with a copolymer of butadiene and 2-methyl-5-vinylpyridine a quaternizing amount of benzotrichloride and a corrosion inhibiting amount of nickel dibutyldithiocarbamate, thereby forming a corrosion inhibited quaternizable stock, curing said stock in a mold and removing quaternized product.

15. A method of forming a quaternized heterocyclic nitrogen-base polymer which comprises blending with a copolymer of butadiene and 2-methyl-5-vinylpyridine a quaternizing amount of hexachloro-p-xylene and a corrosion inhibiting amount of copper dibutyldithiocarbamate, thereby forming a corrosion inhibited quaternizable stock, curing said stock in a mold and removing quaternized product.

16. A quaternized heterocyclic nitrogen-base polymeric product prepared by a process according to claim 8.

17. A quaternized heterocyclic nitrogen-base polymeric product prepared by a process according to claim 13.

18. A quaternized heterocyclic nitrogen-base polymeric product prepared by a process according to claim 15.

References Cited in the file of this patent

UNITED STATES PATENTS

| | | |
|---|---|---|
| 2,387,518 | Lightbown et al. | Oct. 23, 1945 |
| 2,613,195 | Craig | Oct. 7, 1952 |
| 2,716,089 | Cyphers et al. | Aug. 23, 1955 |
| 2,771,462 | Shen | Nov. 20, 1956 |
| 2,789,962 | Groff et al. | Apr. 23, 1957 |

FOREIGN PATENTS

| | | |
|---|---|---|
| 635,787 | Great Britain | Apr. 19, 1950 |
| 654,268 | Great Britain | June 13, 1951 |
| 1,037,097 | France | Sept. 14, 1953 |

UNITED STATES PATENT OFFICE
CERTIFICATE OF CORRECTION

Patent No. 2,956,043                                               October 11, 1960

Henry E. Railsback et al.

It is hereby certified that error appears in the printed specification of the above numbered patent requiring correction and that the said Letters Patent should read as corrected below.

Column 9, lines 10 and 11, strike out "having the formula" and insert the same after "monomer" in line 12, same column; column 10, lines 74 and 75, and column 11, line 1, for "monomer having the formula system comprising heterocyclic nitrogen-base monomer" read -- monomer system comprising a heterocyclic nitrogen-base monomer having the formula --.

Signed and sealed this 25th day of April 1961.

(SEAL)
Attest:

ERNEST W. SWIDER                                         DAVID L. LADD
Attesting Officer                                            Commissioner of Patents